United States Patent [19]

Barr et al.

[11] Patent Number: 5,163,028

[45] Date of Patent: Nov. 10, 1992

[54] METHOD FOR CORRECTING IMPULSE RESPONSE DIFFERENCES OF HYDROPHONES AND GEOPHONES AS WELL AS GEOPHONE COUPLING TO THE WATER-BOTTOM IN DUAL-SENSOR, BOTTOM-CABLE SEISMIC OPERATIONS

[75] Inventors: Frederick J. Barr, Houston; Joe I. Sanders, Sugar Land, both of Tex.

[73] Assignee: Halliburton Geophysical Services, Inc., Sugar Land, Tex.

[21] Appl. No.: 767,248

[22] Filed: Sep. 27, 1991

[51] Int. Cl.⁵ .......................... G01V 1/28; G01V 1/38
[52] U.S. Cl. .......................................... 367/13; 367/21
[58] Field of Search ...................... 367/13, 21, 22, 23, 367/24, 144

[56] References Cited

U.S. PATENT DOCUMENTS

| | | | |
|---|---|---|---|
| 4,134,097 | 1/1979 | Cowles | 181/102 |
| 4,253,164 | 2/1981 | Hall, Jr. | 367/22 |
| 4,437,175 | 3/1984 | Berni | 367/24 |
| 4,486,865 | 12/1984 | Ruehle | 367/24 |
| 4,520,467 | 5/1985 | Berni | 367/24 |
| 4,658,387 | 4/1987 | Dolengowski et al. | 367/144 |
| 4,752,916 | 6/1988 | Lowenthal | 367/24 |
| 4,956,822 | 9/1990 | Barber et al. | 367/23 |

OTHER PUBLICATIONS

Removal of the detector-ground coupling effect in the vertical seismic profiling environment, Wuenschel, vol. 53, No. 3 (Mar. 1988); pp. 359-364.

Reciprocity theorem applied to the geophone-ground coupling problem, Tan, Geophysics., vol. 52, No. 12 (Dec. 1987); pp. 1715-1717.

Geophone Ground Coupling, Krohn, Geophysics: The Leading Edge of Exploration, Apr. 1985, pp. 56-60.

Geophone ground coupling, Krohn, Geophysics. vol. 49, No. 6 (Jun. 1984), pp. 722-731.

The influence of the planted geophone on seismic land data, Hoover and O'Brien, Geophysics. vol. 45, No. 8 (Aug. 1980), pp. 1229-1253.

The Effect of the Placement of a Seismometer on its Response Characteristics, Washburn and Wiley, Presented at the Annual Meeting, Chicago, Apr. 11, 1940.

Primary Examiner—Ian J. Lobo
Attorney, Agent, or Firm—Arnold, White & Durkee

[57] ABSTRACT

In dual-sensor, bottom-cable marine seismic exploration where hydrophone/geophone pairs are deployed on the marine bottom, coupling imperfections between the geophones and the marine bottom contribute to differences between the impulse response of the geophones and the impulse response of the hydrophones. To correct for the coupling imperfection, a filter is designed which compensates for the inherent impulse response differences as well as response differences caused by the imperfect coupling. Preferably, the filter is designed using a calibration procedure prior to production shooting. First, the response of a hydrophone and geophone to a calibration wave is recorded. The calibration wave has a magnitude that is similar to the magnitude of a reflected wave that hydrophone and geophone would detect during normal production shooting. These recorded responses are transformed into the frequency domain. Once transformed, the response of the hydrophone is divided by the response of the geophone to produce a filtering function. When the filtering function is applied to geophone signals during production shooting, the filter compensates the geophone signals to alleviate differences in response characteristics between the geophone signals and the hydrophone signals.

24 Claims, 6 Drawing Sheets

METHOD FOR CORRECTING IMPULSE RESPONSE DIFFERENCES OF HYDROPHONES AND GEOPHONES AS WELL AS GEOPHONE COUPLING TO THE WATER-BOTTOM IN DUAL-SENSOR, BOTTOM-CABLE SEISMIC OPERATIONS

BACKGROUND OF THE INVENTION

1. Field of the Invention

This invention relates generally to marine seismic exploration and, more particularly, to a system for minimizing impulse response and coupling differences between hydrophones and geophones used in marine seismic exploration.

2. Description of the Related Art

In marine seismic exploration, a seismic survey ship is equipped with an energy source and a receiver for taking seismic profiles of an underwater land configuration. The act of taking profiles is often referred to as "shooting" due to the fact that explosive devices have been commonly used for many years as energy sources. The energy source is designed to produce compressional waves that propagate through the water and into the underwater land formation. As the compressional waves propagate through the land formation, they strike interfaces between formations, commonly referred to as strata, and reflect back through the earth and water to the receiver. The receiver typically converts the received waves into electrical signals which are then processed into an image that provides information about the structure of the subterranean formation.

Presently, one of the most common energy sources is an air gun that discharges air under very high pressure into the water. The discharged air forms a pulse which contains frequencies within the seismic range. Another energy source which is frequently used is a marine vibrator. Marine vibrators typically include a pneumatic or hydraulic actuator that causes an acoustic piston to vibrate at a range of selected frequencies. The vibrations of the acoustic vibrator produce pressure differentials in the water which generate seismic pulses free from spurious bubbles.

Just as different energy sources may be used to generate seismic waves in marine applications, different receivers may be used to detect reflected seismic waves. Typically, the receivers most commonly used in marine applications are referred to as hydrophones. Hydrophones convert pressure waves into electrical signals that are used for analog or digital processing. The most common type of hydrophone includes a piezoelectric element which converts physical signals, such as pressure, into electrical signals. Hydrophones are usually mounted on a long streamer which is towed behind the survey ship at a depth of about 30 feet.

Alternatively, marine seismic techniques may use different types of receivers which detect different characteristics of the environment. For instance, in bottom-cable seismic recording, a combination of pressure sensitive transducers, such as hydrophones, and particle velocity transducers, such as geophones, can be deployed on the marine bottom. While geophones are typically used in land operations where metal spikes anchor the geophones to the ground to ensure fidelity of geophone motion to ground motion, geophones cannot be economically anchored in marine applications. Therefore, cylindrical, gimbal geophones are attached to the bottom-cable. After the cable is deployed from the seismic survey ship, the geophones simply lie in contact with the marine bottom where they fall. The gimbal mechanism inside the cylinder assures that the geophone element mounted therein is oriented vertically for proper operation.

As is obvious from the above discussion, a variety of seismic equipment and techniques may be used in an attempt to accurately plot the underwater land formation. Regardless of which technique or combination of equipment is used, each offers certain advantages and disadvantages when compared to one another. For instance, gathering seismic data with a towed streamer in areas populated with numerous obstacles, such as drilling and production platforms, can be difficult or even impossible because the streamer may strike one of the obstacles and tear loose from the towing vessel. Such an event represents an extremely costly loss.

By contrast, in bottom-cable seismic operations, no such difficulty exists because the cable is deployed in a fixed position on the water bottom. However, in the above-mentioned towing technique, the hydrophone being towed behind the survey ship is perfectly coupled to the water in which it is immersed. Unfortunately, in a bottom-cable operation, since there is no practical way to effectively couple a geophone to the marine bottom as it can be coupled to dry land, the geophone is not perfectly coupled to its environment. Therefore, the signals received from the imperfectly coupled geophone do not accurately reflect the quantity being measured.

The present invention is directed to overcoming, or at least minimizing, one or more of the problems set forth above.

SUMMARY OF THE INVENTION

In accordance with one aspect of the present invention, there is provided an improved marine seismic exploration method. First, a seismic wave is generated in the marine environment to be explored. The water pressure and particle velocity are detected, preferably using a hydrophone and geophone respectively. A first signal correlative to the detected pressure and a second signal correlative to the detected velocity are generated. Then, a filter transfer function is calculated using the first and second signals, so that the filter transfer function substantially equalizes response characteristics between the first and second signals.

Preferably, the first and second signals are transformed into first and second frequency domain signals, respectively. Then, one of the frequency domain signals is divided by the other to produce the filter transfer function. If the filter transfer function is intended to compensate the second signal from the geophone for the response difference due to the imperfect coupling of the geophone, the first frequency domain signal is divided by the second frequency domain signal to obtain the filter transfer function. After the filter transfer function has been transformed into a time domain filtering function, subsequent second signals are filtered by the time domain filtering function.

BRIEF DESCRIPTION OF THE DRAWINGS

The foregoing and other advantages of the invention will become apparent upon reading the following detailed description and upon reference to the drawings in which.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives following within the spirit and scope of the invention as defined by the appended claims.

DESCRIPTION OF THE PREFERRED EMBODIMENTS

Figure 1:
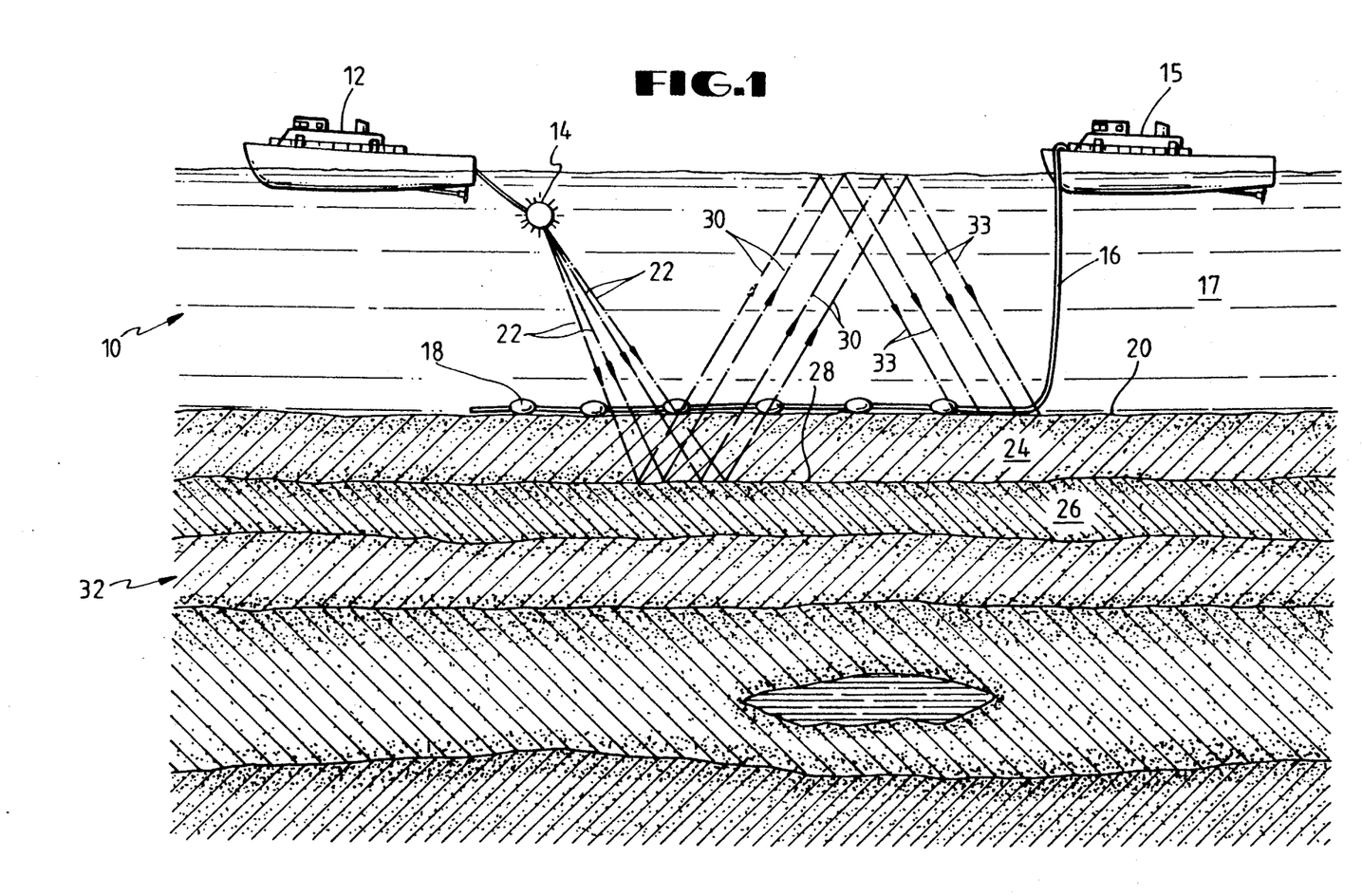
FIG. 1 illustrates apparatus used in a bottom-cable operation.

Turning now to the drawings and referring initially to FIG. 1, a preferred marine seismic survey system is illustrated and generally designated by a reference numeral 10. The system 10 includes a seismic survey ship 12 that is adapted for towing a seismic energy source 14 through a body of water 17. The seismic energy source 14 is an acoustic energy source or an array of such sources. An acoustic energy source preferred for use with the system 10 is a compressed air gun, called a "sleeve gun", which is commercially available from Halliburton Geophysical Services, Inc. of Houston, Tex. The source 14 is constructed and operated in a manner conventional in the art.

The system 10 also includes a receiving ship 15 that is preferably anchored in the body of water 17. The receiving ship 15 deploys a cable 16 on the marine bottom 20, and receives signals from the cable 16 as will be subsequently explained in detail. One preferred cable is commercially available from Tescorp Seismic Products Co. of Houston, Tex., but those skilled in the art recognize that any one of a wide variety of cables can be used.

The cable 16 carries at least one receiver 18, but preferably includes a plurality of such units.

The receiver 18 includes a hydrophone for detecting water pressure and a geophone for detecting water-bottom particle velocity. More particularly, the hydrophones and geophones on the cable 16 are arranged in identical spatial arrays when deployed on the marine bottom 20. Each individual hydrophone has a gimballed geophone positioned next to it. A separate electrical signal is sent to a recording system on the ship 15 for each hydrophone and each geophone spatial array. The survey ship 12 fires the source 14 at predetermined locations while the signals from the hydrophone and geophone arrays are recorded. These signals are typically referred to as reflection data. The data is recorded by a multi-channel seismic recording system that selectively amplifies, conditions and records time-varying electrical signals onto magnetic tape. Advantageously, the system also digitizes the received signals, using a 14 bit analog-to-digital converter for instance, to facilitate signal analysis. Preferably, the ship 15 utilizes a seismic recording system which is commercially available from Halliburton Geophysical Services, Inc. However, those skilled in the art will recognize that any one of a variety of seismic recording systems can be used.

According to a preferred practice, the cable 16 and hydrophone/geophone pair 18 are positioned on the marine bottom 20 for use in three-dimensional, "bottom-cable" operations. Normal production shooting takes place with the survey ship 12 moving at a constant speed along a set of parallel lines, or swath, with respect to the cable 16. After the survey ship 12 completes the swath, the receiving ship 15 or other suitable ship retrieves the cable 16 and re-deploys the cable 16 in a line spaced from, but parallel to, the previous cable location. Once the cable 16 is re-deployed, the survey ship 12 shoots another swath.

During data collection, seismic waves generated by the source 14 travel downwardly, as indicated by the rays 22. These primary waves are reflected off of interfaces between strata, such as the interface 28 between strata 24 and 26, in the subterranean earth formation 32. The reflected waves travel upwardly, as illustrated by the rays 30. The hydrophone/geophone pairs that make up each receiver 18 detect the reflected waves. The receivers 18 generate electrical signals representative of pressure and particle velocity changes inherent to the wave field, and transmit these generated electrical signals back to the survey ship 15 via the cable 16. The recording equipment within the ship 15 records these electrical signals so that they can be subsequently processed to map the subterranean earth formation 32.

It should be understood that the receivers 18 not only detect the reflected waves of interest, but also the primary wave and reverberated waves. Reverberated waves are reflected waves which reflect off of the water-air interface at the surface of the water 17 and travel downwardly in the water 17 to impinge on the receivers 18. Reverberated waves are illustrated by the rays 33 in FIG. 1. The effects of reverberated waves will be discussed subsequently in conjunction with Applicant's U.S. Pat. No. 4,979,150, which issued from application Ser. No. 398,809, filed Aug. 25, 1989, and which is hereby incorporated by reference.

Figure 2:
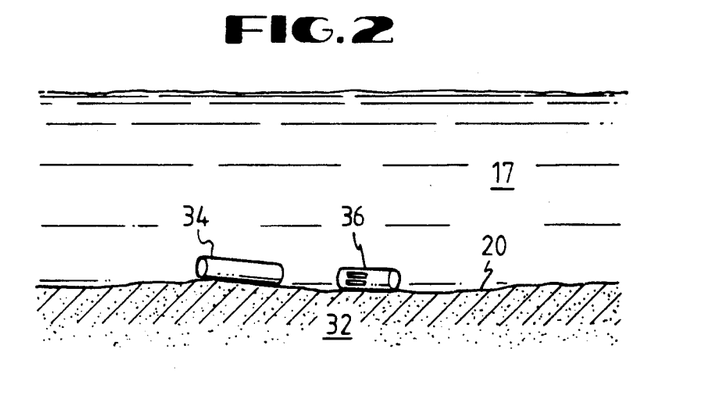
FIG. 2 illustrates a hydrophone/geophone pair lying on the marine bottom.

FIG. 2 illustrates a receiver 18 which includes a gimbal geophone 34 and a hydrophone 36. Preferably, the geophone is a Model SG-1 which is commercially available from SENSOR Nederland b.v. of Voorschoten, Holland, and the hydrophone is a Model MP-24 which is commercially available from OYO Geospace Corp. of Houston, Tex. As illustrated, the geophone 34 and hydrophone 36 are lying on the marine bottom 20, and together comprise a hydrophone/geophone pair. As mentioned previously, dual-sensor detection techniques offer certain advantages because hydrophones detect pressure variations and geophones detect particle velocity variations. However, hydrophones and geophones typically exhibit different impulse response characteristics due, in part, to differences in design. Hence, if we assume that the geophone 34 and hydrophone 36 are perfectly coupled to their environment, i.e., the body of water 17 and the marine bottom 20, then their impulse responses are probably different. If we further assume that the hydrophone 36 has a natural frequency of $\omega_p$ and that the geophone 34 has a natural frequency of $\omega_v$, then when the impulse responses are transformed into the frequency domain, the transfer functions of the geophone 34 and hydrophone 36 are illustrated by the amplitude and phase spectrums shown in FIG. 3. Curves 38 and 40 illustrate the amplitude response with respect to frequency of the geophone 34 and the hydrophone 36, respectively, and curves 42 and 44 illustrate the phase response with respect to frequency of the geophone 34 and the hydrophone 36, respectively.

The transfer functions of the geophone 34 and of the hydrophone 36 determine how the signals that they output correspond to any given input. If the seismic survey system 10 used only one type of receiver or the other, the transfer function of the particular receiver would initially be of interest to determine how the receiver would respond to a variety of foreseeable inputs. But past this determination, the impulse response of any particular type of receiver would be of relatively little importance when processing the signals delivered from such receivers. However, when the seismic survey system 10 includes different types of receivers, such as in the dual-sensor configuration described herein, the recording and/or processing of the electrical signals delivered by such receivers requires that the signal from one type of receiver be combined in some fashion with the signal from another type of receiver. For instance, as described in the referenced patent, a separate electrical signal is sent to the recording system from each hydrophone and each geophone array. The received signals are referred to as reflection data. The recorded hydrophone and geophone reflection data are demultiplexed, gain-removed, and amplitude recovered using identical amplitude recovery curves. The gain-removal process properly uses the K-gain settings of the recording instruments.

Since the electrical signals from each type of receiver are combined during processing, the impulse response of each type of receiver should be substantially identical in order to avoid differences in the respective signals due solely to the impulse response of the respective types of receivers. However, as previously mentioned, due to the differences in design between geophones and hydrophones, it is quite possible that a geophone will have an impulse response different from the impulse response of a hydrophone. Therefore, the system 10 uses a filter designed in accordance with the theoretical or measured impulse responses of the hydrophones and geophones to convert the phase spectrum and normalized amplitude spectrum of the geophone to match that of the hydrophone, or vice versa.

Figure 4:
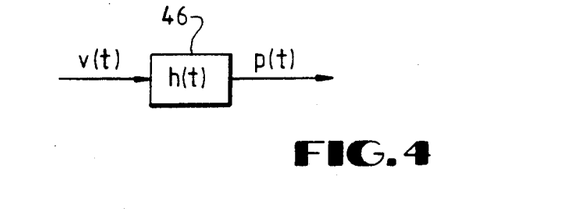
FIG. 4 diagrammatically illustrates a filter that equates the impulse response of a perfectly coupled geophone to the impulse response of a perfectly coupled hydrophone.

One such filter is illustrated in FIG. 4. In this figure, v(t) represents the impulse response of the geophone 34, p(t) represents the impulse response of the hydrophone 36, and h(t) represents the impulse response of a filter 46 which transforms the impulse response of the geophone 34 to equal the impulse response of the hydrophone 36. Therefore, when the signal delivered by the geophone 34 is delivered to the filter 46, the filter 46 modifies the signal to have the same amplitude and phase characteristics as the signal delivered by the hydrophone 36. Preferably, the impulse response h(t) of the filter 46 is designed in the frequency domain by dividing the amplitude spectrum of p(t) by the amplitude spectrum of v(t) and subtracting the phase spectrum of v(t) from the phase spectrum of p(t), as the following equations illustrate mathematically. First, each of the time domain signals are transformed into the frequency domain using an appropriate function, such as a Fourier transform. For instance, the Fourier transform of the impulse response p(t) of the hydrophone 36 is calculated by:

$$P(\omega) = \int p(t)e^{-j\omega t}dt, \text{ and} \qquad \text{Eq. (1)}$$

the impulse response v(t) of the geophone 34 is calculated by:

$$V(\omega) = \int v(t)e^{-j\omega t}dt. \qquad \text{Eq. (2)}$$

Figure 3A:
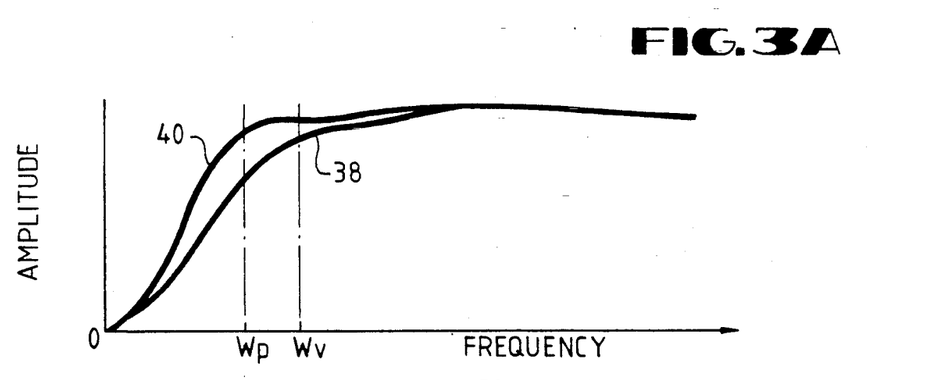
FIG. 3 illustrates the impulse response characteristics of the hydrophone and geophone in the frequency domain assuming that both the hydrophone and geophone are perfectly coupled to their environment.
Figure 3B:
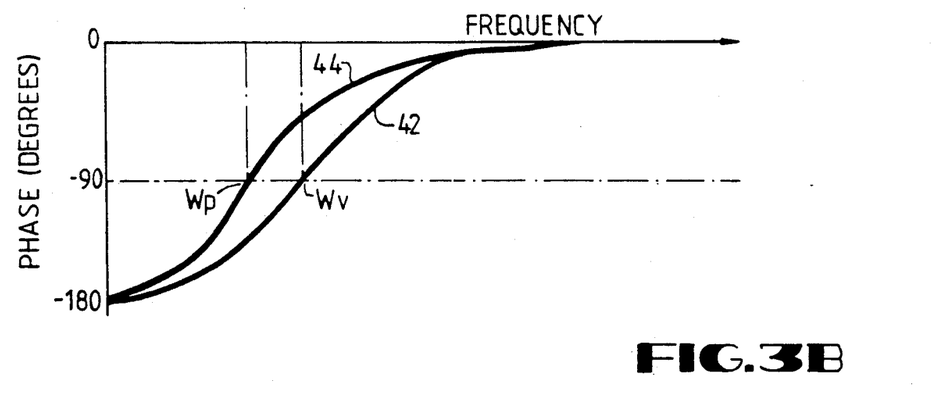
Figure 5A:
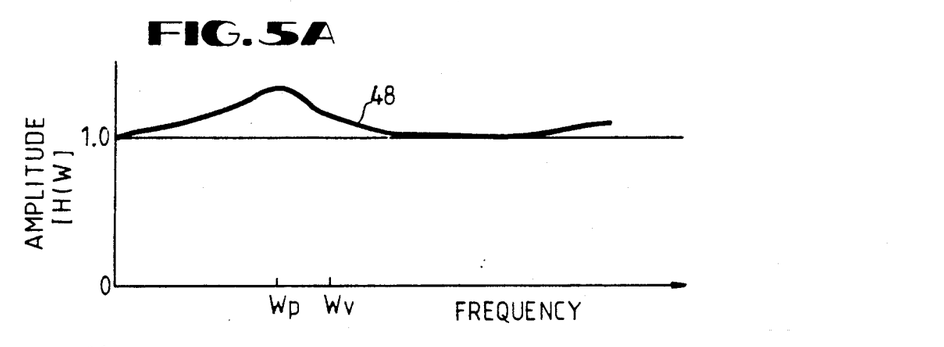
FIG. 5 illustrates the amplitude and phase spectrums of the filter shown in FIG. 4.
Figure 5B:
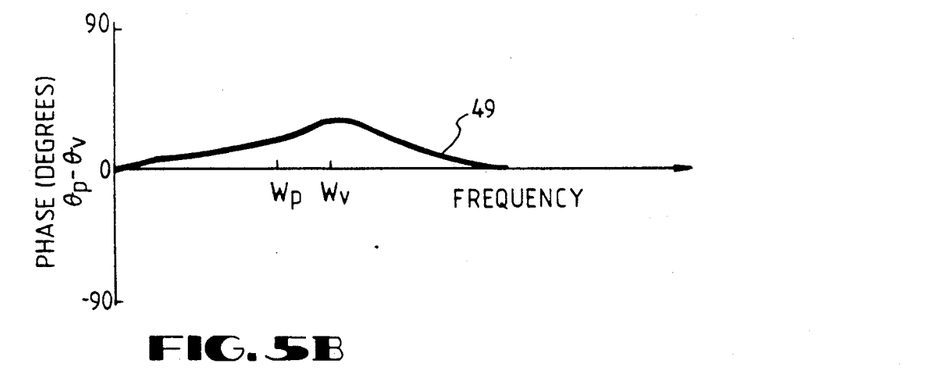

Once the impulse responses of the geophone 34 and hydrophone 36 have been transformed into the frequency domain, it follows from FIG. 4 that:

$$P(\omega) = H(\omega)V(\omega), \text{ so} \qquad \text{Eq. (3)}$$

$$H(\omega) = \frac{P(\omega)}{V(\omega)} = \left| \frac{P(\omega)}{V(\omega)} \right| e^{j(\theta p(\omega) - \theta v(\omega))}, \qquad \text{Eq. (4)}$$

where $|P(\omega)|$ is the magnitude of $P(f)$; 51 $V(\omega)|$ is the magnitude of $V(\omega)$; $\theta_p(\omega)$ is the phase of $P(\omega)$; and $\theta_v(\omega)$ is the phase of $V(\omega)$. The amplitude and phase spectrums of the transfer function $H(\omega)$ for the filter 46 are illustrated in FIG. 5. Notice that the amplitude curve 48 shows an increased response boost near the natural frequency of $\omega_p$ of the hydrophone 36 which should offset the differences between the curves 38 and 40 of FIG. 3. Similarly, the phase curve 49 shows an increased response boost near the natural frequency $\omega_v$ of the geophone 34 which should offset the differences between the curves 42 and 44 of FIG. 3.

The shortcoming of this filter 46 is that by using it one assumes that the geophone 34 moves in perfect synchronization with the particles of the marine bottom 20 as a seismic wave arrives either from the earth formation 32 or from the water 17. When geophones are used in land operations, metal spikes approximately two to three inches long are fitted to the bottoms of all geophone cases. When a geophone is planted at its location, it is driven, spike first, as far into the ground as possible. Moreover, the geophone package is designed to have a density approximately equal to the density of the earth material at the location where the geophone is to be planted. Therefore, when the geophone is planted using the spikes, excellent fidelity of geophone case motion to particle motion results.

However, in the marine dual-sensor, bottom-cable operation described herein, the geophones 34 and hydrophones 36 are deployed in water that may be hundreds of feet deep. Unfortunately, planting the geophones 34 with spikes is impossible, or at least very impractical. Therefore, as mentioned previously, a gimbal mechanism is used to assure that the geophones 34 remain vertically oriented for proper operation when the geophones 34 contact the marine bottom 20. However, since the geophones 34 are not rigidly connected to the marine bottom 20, they do not move exactly in phase or with the same amplitude as the marine bottom particles when a seismic wave arrives.

Figure 6:
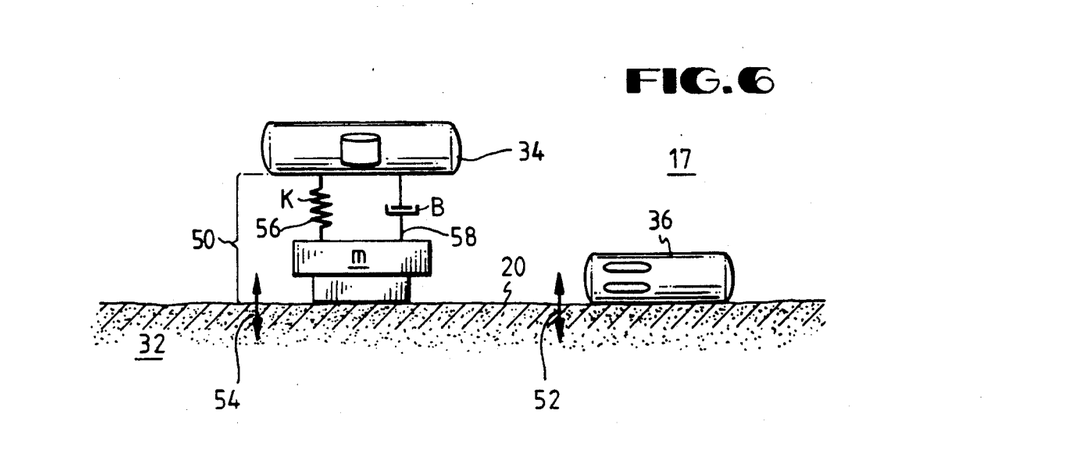
FIG. 6 schematically illustrates a mechanical system that models the coupling between the water bottom and the geophone.

A coupling mechanism 50 which models this problem is illustrated in FIG. 6. As illustrated, both the geophone 34 and the hydrophone 36 are coupled to the marine bottom 20. The double-headed arrow 52 represents the direction of pressure waves impinging upon the hydrophone 36. The pressure waves may either propagate downwardly in the water 17 or upwardly from a reflection in the subterranean formation 32. Since the hydrophone 36 is perfectly coupled to the water to receive pressure waves, the hydrophone 36 is illustrated as being directly connected to the marine bottom 20.

Similarly, the double-headed arrow 54 represents the direction of particle motion of the marine bottom 20. However, since the geophone 34 is not perfectly coupled with the marine bottom 20, the coupling mechanism 50 represents an analytical model of this coupling imperfection. In other words, the geophone 34 responds to movement of the water bottom 20 as if it were connected to the water bottom 20 by an unsprung mass m, a spring 56 having a spring constant k, and a damper 58 having a damping constant B. By taking into account the effects caused by this imperfect coupling, a more accurate determination of the velocity of particle motion of the marine bottom 20 may be made. Using this model, it is easy to visualize that as the particles of the water bottom 20 affect the unsprung mass m, which is illustrated as being perfectly coupled to the water bottom 20, the unsprung mass m will in turn affect the geophone 34 as if the geophone 34 were connected to the unsprung mass m via the spring 56 and the damper 58. The spring 56 and the damper 58 will affect the force and energy transferred from the unsprung mass m to the geophone 34. Thus, the response of the geophone 34 is adversely affected by its imperfect coupling, since the coupling mechanism 50 filters the velocity characteristic sought to be measured.

Figure 7A:
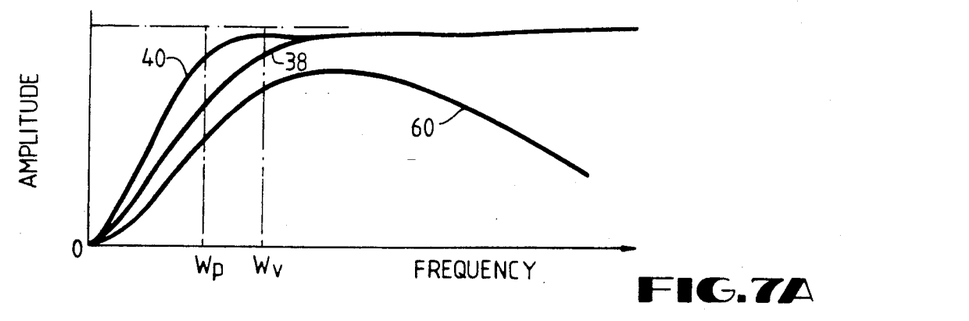
FIG. 7 illustrates the effect of imperfect geophone coupling on the geophone's response to a seismic impulse.
Figure 7B:
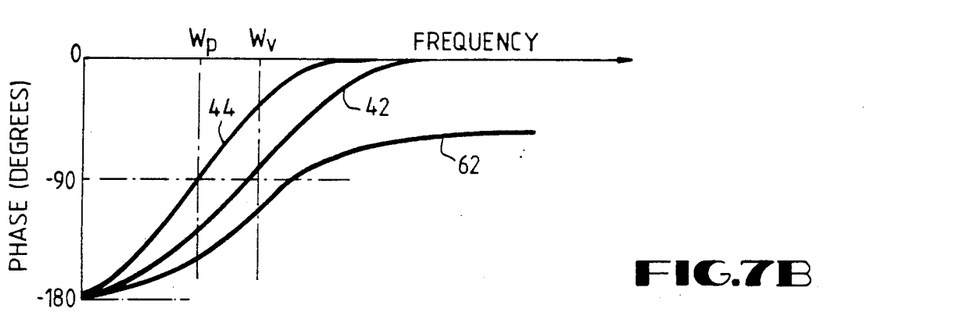

FIG. 7 illustrates the expected effect of imperfect coupling on the geophone's response to a seismic impulse. Like the curves shown in FIG. 3, FIG. 7 illustrates the impulse responses of the geophone 34 and hydrophone 36 after having been transformed into the frequency domain. Therefore, curve 60 represents the amplitude with respect to frequency transfer function of the system which includes the geophone 34 and the coupling mechanism 50. Similarly, the curve 62 illustrates the phase with respect to frequency transfer function of the geophone 34 and coupling mechanism 50. The curves 38-44 are reproduced for ease of comparison with the curves 60 and 62. In this example, the curves 60 and 62 show that the amplitude response of the geophone 34 is less sensitive to high frequencies than it would normally be if it were perfectly coupled. Moreover, its response is delayed, as indicated by the increased phase lag of the curve 62 with respect to the curve 42.

Having recognized this problem, the imperfect geophone coupling should be taken into account when correcting the impulse response of the hydrophone/geophone pair 18 during recording and processing. The problem with ignoring the imperfect coupling of the geophone 34 and the effect it has on the response of the geophone 34 is apparent from the previous discussion. If the filter 46 were applied to the geophone signal in order to match the impulse response of the geophone 34 to the impulse response of the hydrophone 36, engineers entrusted with recording and processing the data from the hydrophone/geophone pair 18 would assume that the filter 46 compensated for any differences in response between the hydrophone 36 and the geophone 34. However, the filter 46 does not compensate for the difference in response of the geophone 34 caused by the imperfect coupling of the geophone 34 with the marine bottom 20. Hence, the impulse responses of the geophone 34 and the hydrophone 36 are still different even though the filter 46 provides partial compensation in the illustrated example of FIG. 7.

Figure 10:
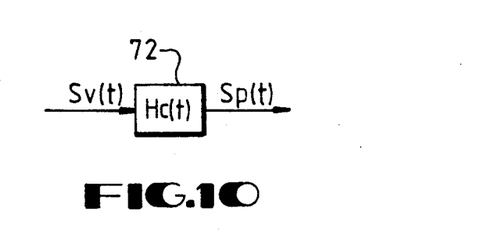
FIG. 10 diagrammatically illustrates a filter that equates the response of an imperfectly coupled geophone to the response of a perfectly coupled hydrophone.

To compensate for the difference in impulse response between the imperfectly coupled geophone 34 and the perfectly hydrophone 36, a filter 72 having an appropriate response is designed as illustrated in FIG. 10. While the filter 72 can be designed either theoretically or empirically, the following discussion describes a preferred practical method, in accordance with the previously discussed theoretical assumptions, for determining the appropriate response of the filter 72.

Figure 8:
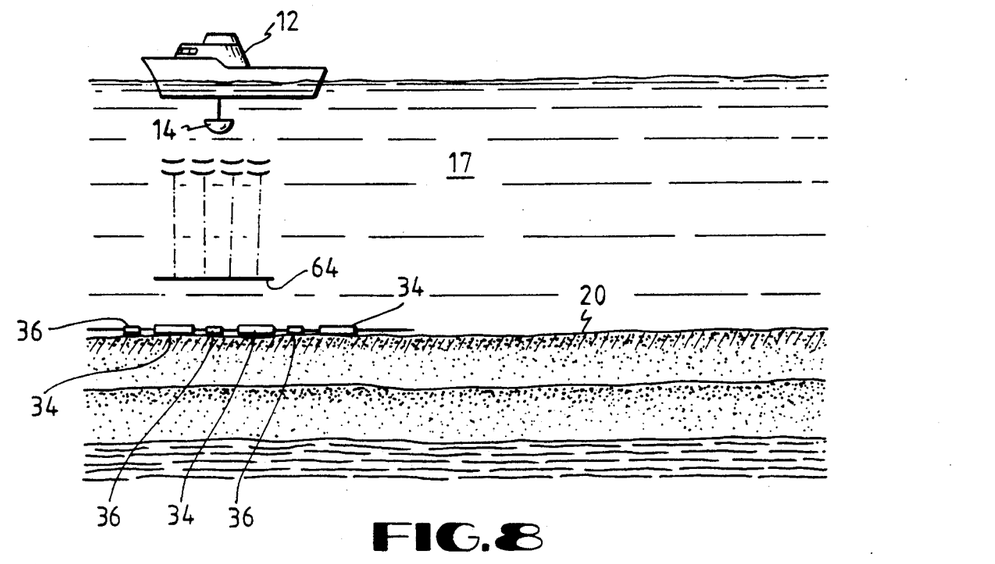
FIG. 8 illustrates a downwardly propagating pressure wave impinging on the hydrophone/geophone pairs on the marine bottom.

After the cable 16 has been deployed on the marine bottom 20, as illustrated in FIG. 8, the survey ship 12 performs a calibration shooting operation. The calibration operation includes recording the responses of the geophones 34 and hydrophones 36 to a downwardly propagating seismic wave produced by the seismic energy source 14. The seismic energy source 14 generates a wavefront 64 having a waveform w(t), which is referred to as the primary wave generated by the seismic energy source 14. Recall that the primary wave was defined in FIG. 1 using the rays 22.

During production shooting, the source 14 includes an array of air guns which are fired simultaneously. However, during the calibration shooting operation, firing the entire array may overdrive the receivers 18. Therefore, only a portion of the air gun array, such as one or two guns, is used during calibration. As will be recognized by those skilled in the art, the number of guns used depends on parameters such as water depth, air gun volume, and the electrical characteristics of the receivers.

To illustrate the problem trying to be avoided, consider, for instance, the calibration procedure for a geophone on land. The geophone is calibrated by dropping a ball bearing on it. If the ball bearing strikes the geophone too hard, it drives the soil into a non-linear region not reached during normal seismic recording. Thus, the signals recorded from the geophone are not entirely indicitive of the signals that the geophone would produce during normal seismic recording.

In the present context regarding the calibration of a hydrophone/geophone pair, the downwardly propagating calibration wavefront w(t) is preferably of about the same magnitude as a reflected seismic wave that the pair would receive during a normal shooting operation. The magnitude of the calibration wavefront w(t) should be large enough to provide a good signal-to-noise ratio. Therefore, the magnitude of the calibration wavefront w(t) may be greater than a reflected seismic wave in order to provide a good signal-to-noise ratio in environments having high ambient noise.

Figure 9:
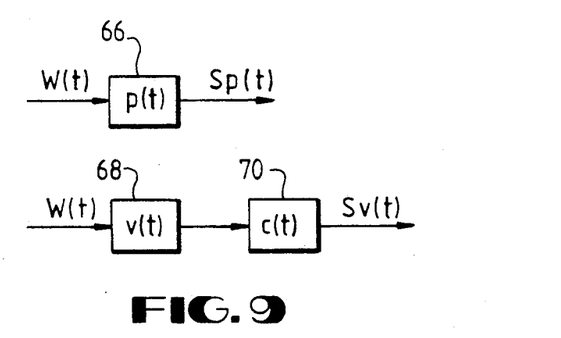
FIG. 9 diagrammatically illustrates the response of a geophone and hydrophone to the pressure wave of FIG. 8.

The response of the geophones 34 and of the hydrophones 36 to the impinging wavefront 64 is illustrated in the block diagram of FIG. 9 where p(t) in block 66 represents the impulse response of a hydrophone 36, v(t) in block 68 represents the impulse response of a geophone 34, and c(t) in block 70 represents the impulse response of the coupling mechanism 50. When the wavefront 64 strikes the hydrophones 36, each hydrophone 36 outputs a signal represented by $s_p(t)$. Similarly, when the wavefront 64 strikes the geophones 34, each geophone 34 outputs a signal represented by $s_v(t)$. Therefore, the response of each of the hydrophones 36 is equal to the impact of the wavefront 64 defined as w(t) filtered by the impulse response p(t) of the hydrophone 36. The response of each of the geophones 34 is equal to the impact w(t) of the wavefront 64 filtered by both the impulse response v(t) of the geophone 34 and the impulse response c(t) of the coupling mechanism 50.

Once the signals from a hydrophone/geophone pair 18 are recorded, the filter 72 having an impulse response $h_c(t)$ can be designed which will transform the response $s_v(t)$ of the geophone 34 into the response $s_p(t)$ of the hydrophone 36, as illustrated in FIG. 10. First, these signals are transformed into the frequency domain, so that the signal from the hydrophone 36 is defined by:

$$S_p(\omega) = P(\omega) W(\omega), \text{ and} \qquad \text{Eq. (5)}$$

the signal from the geophone 34 is defined by:

$$S_v(\omega) = V(\omega) C(\omega) W(\omega) \qquad \text{Eq. (6)}$$

So, from FIG. 10 it follows that:

$$S_p(\omega) = S_v(\omega) H_c(\omega). \qquad \text{Eq. (7)}$$

Then, the filter 72 having a transfer function $H_c(\omega)$ is designed by dividing the Fourier transform of the hydrophone's recorded waveform $s_p(t)$ by the Fourier transform of the geophone's recorded waveform $s_v(t)$.

$$H_c(\omega) = \frac{S_p(\omega)}{S_v(\omega)} = \frac{P(\omega)W(\omega)}{V(\omega)C(\omega)W(\omega)} = \frac{P(\omega)}{V(\omega)C(\omega)} \qquad \text{Eq. (8)}$$

Figure 11A:
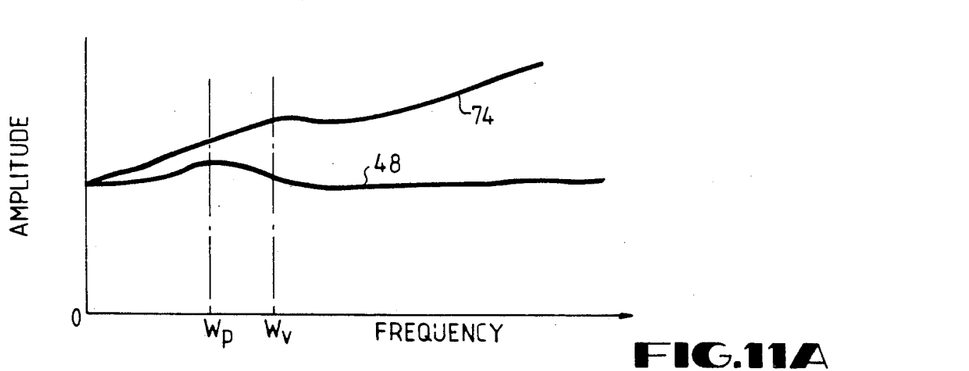
FIG. 11 illustrates the amplitude and phase spectrums of the filter shown in FIG. 10.
Figure 11B:
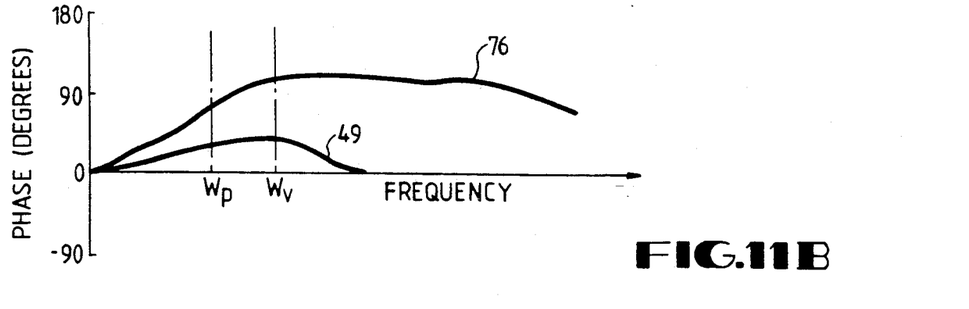

The transfer function of the filter 72 is illustrated in FIG. 11. The curve 74 shows an increased amplitude spectrum boost as compared with the curve 48 which represents the amplitude spectrum of the filter 46. Similarly, the curve 76 shows an increased phase spectrum correction as compared with the curve 49 which represents the phase spectrum for the filter 46. Therefore, the filter 72 having the transfer function characteristics illustrated in FIG. 11 will compensate the respective curves 60 and 62 so that the compensated impulse response signal from the geophone 34 will be substantially equal to the impulse response signal from the hydrophone 36. The filter 72, once designed, is then applied to the geophone data traces recorded during production shooting.

It should be apparent that, while the above discussion is directed toward compensating the response of the geophone 34, a similar method may be used to compensate the response of the hydrophone 36 so that it would be substantially the same as the response of the imperfectly coupled geophone 34. A filter so produced would be applied to the hydrophone data traces recorded during production shooting, and would essentially introduce the effects of the coupling mechanism into the hydrophone's signal.

Preferably, this technique is used in conjunction with the reverberation attenuation technique disclosed in the referenced patent. To explain how the above-described method may be used in conjunction with a method which also corrects geophone data for optimum reverberation attenuation, a slight modification of the foregoing explanation is required. First, as explained in the referenced patent, the responses of the geophones 34 and hydrophones 36 to a downwardly propagating wavefront 64 are opposite in polarity. Therefore, before the filter 72 may be designed in accordance with the above method, the polarity of the recorded geophone response $s_v(t)$ is reversed. Otherwise, the filter 72 would perform this polarity reversal on the production seismic reflection data transmitted by the geophones 34, and, thus, the destructive reverberation energy would be enhanced instead of patent, the amplitude of the hydrophone's response to the wavefront 64 is affected by the water bottom reflection coefficient $K_r$ and is proportional to $(1+K_r)$. In addition, the amplitude of the geophone's response to the wavefront 64 is similarly affected by the marine bottom reflection coefficient $K_r$ and is proportional to $(1-K_r)$ By designing the filter 72 in accordance with the following discussion, results in the correction provided by the correction factor $(1+K_r)/(1-K_r)$ which is applied to the geophone data as described in the referenced patent.

Figure 12:
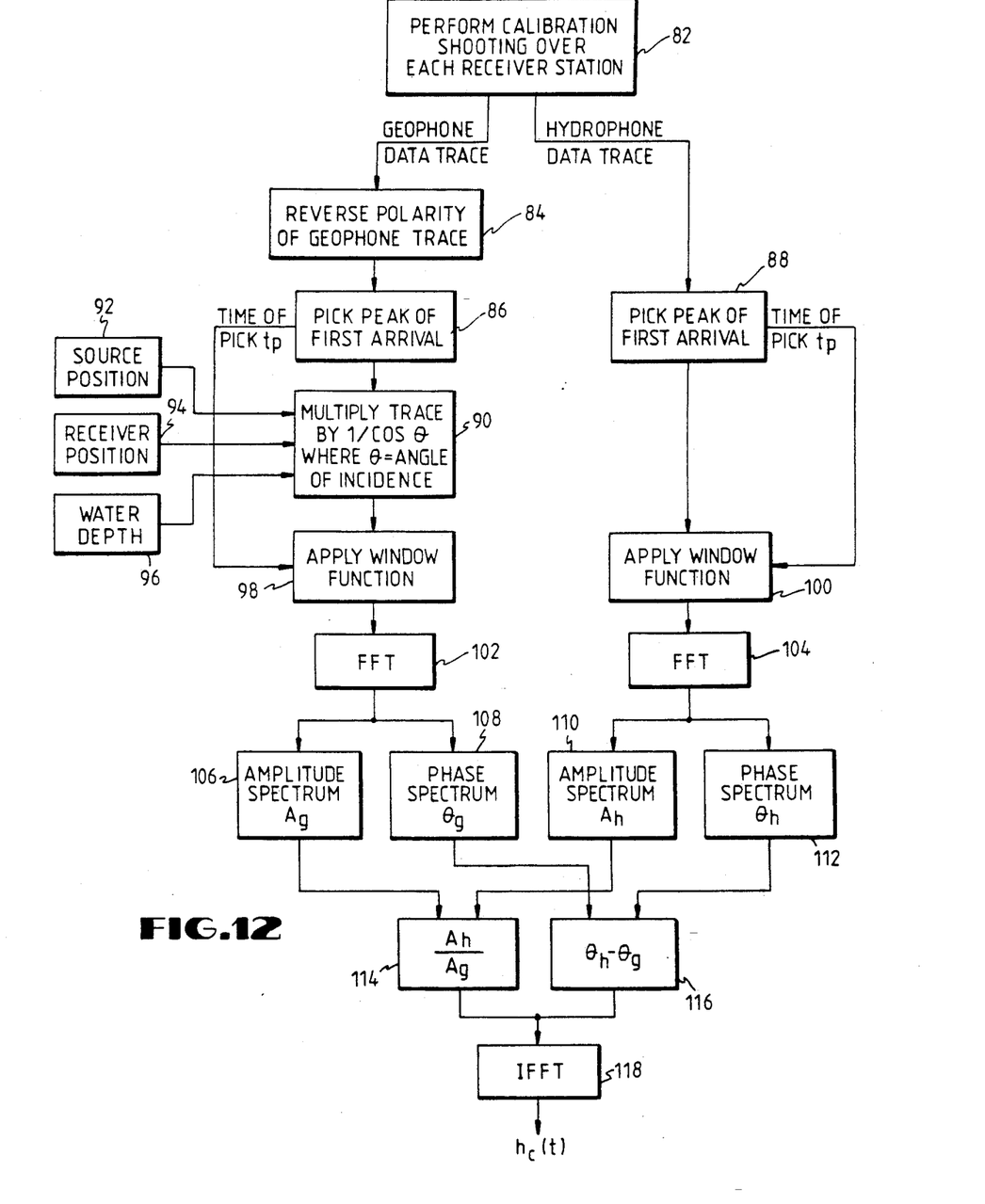
FIG. 12 is a flow diagram of a preferred method for designing the filter shown in FIG. 10.

FIG. 12 illustrates a flow diagram 80 which represents a preferred way to perform the method for designing the filter 72. First, the survey ship 12 performs at least one calibration shooting pass. This step involves firing the energy source 14 directly above the receivers 18 and recording the resulting signals from the geophones 34 and hydrophones 36, as shown in block 82. Once the recording equipment receives a signal from each of the receivers 18 the survey ship may begin production shooting. Preferably, the survey ship 12 performs both the production shooting immediately following the calibration shooting, so that all of the shooting is recorded for processing at a later time. Preferably, a Model 3090 IBM mainframe computer running a "TIPEX" operating system (commercially available from Halliburton Geophysical Services, Inc. of Houston, Tex.) is used to process the calibration and reflection data.

It should be understood that the processor designs the filter 72 using the calibration data and, then, applies the filter 72 to reflection data from the respective geophones. Thus, the following portion of the flow diagram 80 refers to the design of the filter 72 using the calibration data. In block 84, the processor reverses the polarity of the geophone data trace for the reasons previously mentioned. In blocks 86 and 88, peak detectors receive the geophone and hydrophone data traces to determine the peaks of the first arrival waveforms output by the geophones 34 and hydrophones 36, respectively. Preferably, this peak detection is performed interactively using a personal computer program called "PC Analysis." This program is a general data analysis program that contains a variety of signal processing subroutines, such as a multi-channel seismic event selecting algorithm used here, and is used by Halliburton Geophysical Services, Inc. This program can generate a text file which denotes, among other things, the time of occurrence of the picked peaks, referred to herein as $t_p$. However, those skilled in the art will recognize that any one of a variety of other types of peak detectors, such as the one found in STATIX, a software package available from Sierra Geophysics, Inc. of Seattle, Wash., may be used instead. As will be explained shortly, the time corresponding to the peaks of the primary wavefront will be used to isolate the effects of the primary wavefront from the effects of reflected or reverberated wavefronts.

Block 90 receives the position of the source 14 from block 92, the position of the receiver 19 from block 94, and information regarding the depth of the water 17 from block 96. Typically, this information is generated by the crew of the survey ship 12 as part of its normal data generation activity. The crew uses a radio navigation system that typically includes three or more radio transmitters that are positioned at known locations on shore. These transmitters cooperate with receivers on board the ship to enable the system to compute the exact location of the ship during surveying. Preferably, the crew uses a radio navigation system called "Syledis" which is commercially available from Sercel, Inc. of Nantes, France. From this information, the angle of arrival of the seismic waveform $w(t)$, with respect to a vertical reference, is calculated using simple algebraic manipulation in view of the geometrical relationships obtained from the blocks 92-96. The effect of a non-zero angle of incidence upon the amplitude of the geophone's response is removed by multiplying its data trace by the reciprocal of the cosine of that angle, as illustrated in block 90.

Next, in blocks 98 and 100, a window function is generated and applied to the geophone and hydrophone data traces. The window function isolates the electrical signals resulting from the primary wave from the electrical signals resulting from reflected or reverberated waves. Preferably, this window function has an amplitude of 1.0 from time $t=0.0$ to $t=t_p$. After $t=t_p$, the window function has the shape of a cosine squared function that decreases in amplitude from 1.0 at time $t=t_p$ to an amplitude of zero at time $t=t_p+\Delta t$. A value for $\Delta t$ which has worked very well is 26 milliseconds.

Once the responses of the geophones 34 and hydrophones 36 to the primary wave are isolated, the Fourier transforms of the resulting geophone and hydrophone traces are computed in blocks 102 and 104. Preferably, traditional Fast Fourier transforms are used to transform the incoming signals from the time domain to the frequency domain. One computer algorithm for a Fast Fourier Transform is given by W. H. Press, et al., *Numerical Recipes: The Art of Scientific Computing*. Cambridge University Press 1986 (reprinted 1988). In block 106, the amplitude spectrum for the geophone trace is calculated; in block 108, the phase spectrum for the geophone trace is calculated; in block 110, the amplitude spectrum for the hydrophone trace is calculated; and, in block 112, the phase spectrum for the hydrophone trace is calculated. Thereafter, the amplitude spectrum from the hydrophone data trace is divided by the amplitude spectrum of the geophone data trace in block 114. Similarly, in block 116, the phase spectrum of the geophone trace is subtracted from the phase spectrum of the hydrophone trace. (Refer to Eq. (8).) Those skilled in the art will appreciate that data manipulation of this type is easily accomplished in the frequency domain using simple mathematical operations such as division and subtraction. However, this data manipulation could take place in the time domain using much more complex mathematical operations, such as convolution. Finally, the Inverse Fourier transform is computed, preferably using an Inverse Fast Fourier transform as known in the art, in block 118. The resulting time domain impulse function $h_c(t)$ is the desired geophone data correction filter 72.

Once the processor has determined the appropriate filter 72, the impulse function $h_c(t)$, i.e., the filtering function describing the filter 72, is stored in memory. Preferably, the processor stores the filtering function on a hard disk on the mainframe, as is well known in the art. Once stored, as the processor inputs the production reflection data, as described in the referenced patent application, the processor applies the filtering function to the geophone data trace prior to processing the geophone data trace with the corresponding hydrophone data trace.

Preferably, the method described in the flow diagram 80 is performed for each hydrophone/geophone pair location so that a separate filter 72 is designed for each hydrophone/geophone pair 18. Thus, every data trace recorded by the geophones 34 at a particular receiver location during the production of seismic reflection data gathering is filtered by a particular filter 72. The filtered geophone data traces are then summed with the corresponding hydrophone data traces at each receiver location to optimally attenuate any reverberation energy arriving at the hydrophone/geophone pair from above, in accordance with the method described in the referenced patent.

We claim:

1. An improved marine seismic exploration method comprising the steps of:
   generating a calibration wave into a marine environment, said calibration wave being a primary seismic wave having a magnitude substantially equal to a magnitude of a reflected seismic wave produced during production shooting;
   detecting water pressure at a first position in said marine environment resulting from said calibration wave and generating a first signal correlative to said detected pressure;
   detecting particle velocity at a second position in said marine environment resulting from said calibration wave and generating a second signal correlative to said detected velocity; and
   calculating a filter transfer function using said first and second signals, said filter transfer function substantially equalizing response characteristics between said first and second signals.

2. The method, as set forth in claim 1, wherein said step of generating a calibration wave comprises the steps of:
   submersing an air gun array having a plurality of air guns into said marine environment; and
   firing a portion of said plurality of air guns to produce said calibration wave.

3. The method, as set forth in claim 1, wherein said step of calculating comprises the steps of:
   transforming said first and second signals into first and second frequency domain signals, respectively;
   dividing said first frequency domain signal by said second frequency domain signal to obtain said filter transfer function; and
   transforming said filter transfer function into a time domain filtering function.

4. The method, as set forth in claim 3, further comprising the step of:

filtering subsequent second signals by said time domain filtering function.

5. The method, as set forth in claim 1, wherein said step of calculating a filter transfer function comprises the steps of:

transforming said first and second signals into first and second frequency domain signals, respectively;

dividing said second frequency domain signal by said first frequency domain signal to obtain said filter transfer function; and transforming said filter transfer function into a time domain filtering function.

6. The method, as set forth in claim 5, further comprising the step of:

filtering subsequent first signals by said time domain filtering function.

7. An improved marine seismic exploration method comprising the steps of:

generating a calibration wave into a marine environment, said calibration wave being a primary seismic wave having a magnitude substantially equal to a magnitude of a reflected seismic wave produced during production shooting;

detecting water pressure at a first position in said marine environment resulting from said calibration wave and generating a first signal correlative to said detected pressure;

detecting particle velocity at a second position in said marine environment resulting from said calibration wave and generating a second signal correlative to said detected velocity;

transforming said first and second signals into first and second frequency domain signals, respectively;

dividing one of said first and second frequency domain signals by the other of said first and second frequency domain signals to obtain a filtering function;

transforming said filtering function into a time domain filter;

applying said time domain filter to one of said first and second signals generated as a result of subsequent seismic waves produced during production shooting and having a magnitude greater than said magnitude of said calibration wave.

8. The method, as set forth in claim 7, wherein said first-mentioned step of transforming comprises the step of:

calculating a Fourier transform of said first signal and of said second signal.

9. The method, as set forth in claim 7, wherein said step of dividing comprises the step of:

dividing said first frequency domain signal by said second frequency domain signal to obtain said filtering function.

10. The method, as set forth in claim 9, wherein said step of applying said time domain filter to one of said first and second signals comprises the step of:

filtering subsequent second signals by said time domain filter.

11. The method, as set forth in claim 7, wherein said step of dividing is accomplished by dividing said second frequency domain signal by said first frequency domain signal to obtain said filtering function.

12. The method, as set forth in claim 11, wherein said step of applying said time domain filter to one of said first and second signals comprises the step of:

filtering subsequent first signals by said time domain filter.

13. The method, as set forth in claim 7, wherein said step of transforming said filtering function into a time domain filter comprises the step of:

calculating an inverse Fourier transform of said first signal and of said second signal.

14. A method of calibrating a geophone/hydrophone receiver pair in a marine environment, said method comprising the steps of:

deploying said geophone/hydrophone receiver pair in said marine environment;

generating a calibration wave into said marine environment, said calibration wave being a primary seismic wave having a magnitude substantially equal to a magnitude of a reflected seismic wave produced during production shooting;

generating a first signal correlative to a detected pressure through implementation of said hydrophone detecting water pressure resulting from receiving said calibration wave;

generating a second signal correlative to a detected velocity through implementation of said geophone detecting particle velocity resulting from receiving said calibration wave;

transforming said first and second signals into first and second frequency domain signals, respectively;

dividing one of said first and second frequency domain signals by the other of said first and second frequency domain signals to obtain a filter transfer function;

transforming said filter transfer function into a time domain filter; and applying said time domain filter to one of said first and second signals generated as a result of subsequent seismic waves produced during production shooting and having a magnitude greater than said magnitude of said calibration wave.

15. The method, as set forth in claim 14, wherein said step of transforming said first and second signals comprises the step of:

calculating a Fourier transform of said first signal and of said second signal.

16. The method, as set forth in claim 14, wherein said step of transforming said filter transfer function comprises the step of:

calculating an inverse Fourier transform of said filter transfer function.

17. The method, as set forth in claim 14, wherein said step of dividing is accomplished by:

dividing said first frequency domain signal by said second frequency domain signal to obtain said filter transfer function.

18. The method, as set forth in claim 17, wherein said step of applying comprises the step of:

filtering subsequent second signals by said time domain filter.

19. The method, as set forth in claim 14, wherein said step of dividing is accomplished by:

dividing said second frequency domain signal by said first frequency domain signal to obtain said filter transfer function.

20. The method, as set forth in claim 19, wherein said step of applying said time domain filter comprises the step of:

filtering subsequent first signals by said time domain filter.

21. The method, as set forth in claim 14, further comprising the step of:

reversing polarity of said second signal and delivering a repolarized second signal;

22. The method, as set forth in claim 14, further comprising the steps of:
   determining an angle of incidence at which said seismic wave strikes said geophone; and
   adjusting said repolarized second signal to correct for said determined angle of incidence if said determined angle of incidence is greater than zero degrees.

23. A method of calibrating a geophone/hydrophone receiver pair in a marine environment, said method comprising the
   deploying said geophone/hydrophone receiver pair in said marine environment;
   generating a calibration wave into said marine environment, said calibration wave being a primary seismic wave having a magnitude substantially equal to a magnitude of a reflected seismic waver produced during production shooting;
   generating a first signal correlative to a detected pressure through implementation of said hydrophone detecting water pressure resulting from receiving said calibration wave, said first signal being influenced by a particular electrical response characteristic of said hydrophone;
   generating a second signal correlative to a detected velocity through implementation of said geophone detecting particle velocity resulting from receiving said calibration wave, said second signal being influenced by a particular electrical response characteristic of said geophone and by a particular mechanical response characteristic of said geophone;
   transforming said first and second signals into first and second frequency domain signals, respectively;
   dividing one of said first and second frequency domain signals by the other of said first and second frequency domain signals to obtain a filter transfer function;
   transforming said filter transfer function into a time domain filter; and
   substantially equalizing said electrical response characteristic of said hydrophone with said electrical and mechanical response characteristics of said geophone by applying said time domain filter to only one of said first and second signals generated as a result of a subsequent seismic wave produced during production shooting, said subsequent seismic wave having a magnitude greater than said magnitude of said calibration wave.

24. A method for correcting a coupling difference between a hydrophone and a geophone in a marine environment, said method comprising the steps of:
   placing said hydrophone in said marine environment, said hydrophone being perfectly coupled with said marine environment;
   placing said geophone in said marine environment, said geophone ring imperfectly coupled with said marine environment;
   generating a calibration wave into said marine environment, said calibration wave being a primary seismic wave having a magnitude substantially equal to a magnitude of a reflected seismic wave produced during production shooting;
   detecting a signal produced by said hydrophone in response to said seismic, said hydrophone signal being influenced by an electrical impulse response of said hydrophone;
   detecting a signal produced by said geophone in response to said seismic wave, said geophone signal being influenced by an electrical impulse response of said geophone and by a mechanical impulse response of said geophone produced by said imperfect coupling;
   transforming said hydrophone signal and said geophone signal into first and second frequency domain signals, respectively;
   dividing one of said first and second frequency domain signals by the other of said first and second frequency domain signals to obtain a filter transfer function;
   transforming said filter transfer function into a time domain filter; and
   substantially equalizing said electrical response characteristic of said hydrophone with said electrical and mechanical response characteristics of said geophone by applying said time domain filter to only one of said hydrophone signal and geophone signal generated as a result of a subsequent seismic wave produced during production shooting, said subsequent seismic wave having a magnitude greater than said magnitude of said calibration wave.

* * * * *

UNITED STATES PATENT AND TRADEMARK OFFICE
CERTIFICATE OF CORRECTION

PATENT NO. : 5,163,028
DATED : November 10, 1992
INVENTOR(S) : Frederick J. Barr, et al.

It is certified that error appears in the above-indentified patent and that said Letters Patent is hereby corrected as shown below:

Column 6, line 38, "$\int$" should be --$\omega$--.

Column 6, line 38, "51" should be --|--.

Column 10, line 19, after "of" and before "patent" insert --attenuated. Secondly, as also explained in the referenced--.

Column 15, line 13, after "the" add --steps of:--.

Column 15, line 19, "waver" should be --wave--.

Column 16, line 19, after "seismic" add --wave--.

Signed and Sealed this

Nineteenth Day of October, 1993

Attest:

BRUCE LEHMAN

*Attesting Officer*   *Commissioner of Patents and Trademarks*